United States Patent
Vannatta et al.

(10) Patent No.: US 6,618,365 B1
(45) Date of Patent: Sep. 9, 2003

(54) METHOD AND APPARATUS TO REDUCE UPLINK COMPRESSED MODE MONITORING IN A COMMUNICATION DEVICE

(75) Inventors: Louis J. Vannatta, Crystal Lake, IL (US); Edgar P. Fernandes, Harestock (GB); Niels Peter Skov Andersen, Roskilde (DK)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/134,840

(22) Filed: Apr. 29, 2002

(51) Int. Cl.[7] .................................................. H04Q 7/00

(52) U.S. Cl. ..................... 370/333; 370/335; 370/342

(58) Field of Search ................................ 370/318, 328, 370/332, 333, 335, 342, 44, 431, 341, 329, 521, 62, 63; 455/517, 592, 507

(56) References Cited

U.S. PATENT DOCUMENTS

| | | | |
|---|---|---|---|
| 5,896,368 A | * 4/1999 | Dahlman et al. | ........... 370/335 |
| 6,181,683 B1 | 1/2001 | Chevillat et al. | |
| 6,456,847 B1 | * 9/2002 | Lilja et al. | ................... 455/437 |
| 2002/0110100 A1 | * 8/2002 | Itoh | ........................... 370/332 |
| 2002/0151325 A1 | * 10/2002 | Fitton et al. | ................. 455/553 |

OTHER PUBLICATIONS

3G TS 25.201, 3rd Generation Partnership Project: Technical Specification Group Radio Access Network: Physical Layer—General Description (Release 1999), v3.1.0 (2000–06).

3G TS 25.215, 3rd Generation Partnership Project: Technical Specification Group Radio Access Network: Physical Layer—Measurements (FDD)(Release 1999), v3.3.0(2000–06).

3G TS 25.212, 3rd Generation Partnership Project: Technical Specification Group Radio Access Network: Multiplexing and Channel Coding (FDD)(Release 1999), v3.1.0 (2000–06), Sec. 4.3.5.

* cited by examiner

Primary Examiner—Ajit Patel
(74) Attorney, Agent, or Firm—Brian M. Mancinit

(57) ABSTRACT

An apparatus and method to reduce uplink compressed mode monitoring in a communication device includes a first step of monitoring a neighboring channel and measuring a channel signal strength. An desense of the monitoring receiver is estimated to determine a threshold, which is compared to the signal strength. If the signal strength is less than the threshold, a new neighboring channel is monitored to see if the signal strength changes. If not, the measured signal is probably interference. In this case, the communication device can request uplink compressed mode to get an accurate signal strength measurement. Only under these condition are uplink compressed mode called for, instead of full time compressed mode, thereby maintaining data capacity.

20 Claims, 3 Drawing Sheets

METHOD AND APPARATUS TO REDUCE UPLINK COMPRESSED MODE MONITORING IN A COMMUNICATION DEVICE

FIELD OF THE INVENTION

The present invention relates to the control of an operating mode of a radio communication device. More particularly the invention relates to a method and apparatus for operating an uplink in a multi-mode radio communication device.

BACKGROUND OF THE INVENTION

New digital cellular communication systems, such as the Wideband Code Division Multiple Access (WCDMA) extension of the Global System for Mobile Communication (GSM) and Digital Cellular System (DCS) can utilize different operating modes for the transfer of digital information. For example, digital information can be transferred using two different duplex modes, Frequency Division Duplex (FDD) and Time Division Duplex (TDD), as are known in the art, and use different operating frequency bands. The GSM system operates in the 900, 1800 and 1900 MHz bands, while the DCS system also operates in the 1800 MHz band. Allowing the operation in the different FDD and TDD modes provides more efficient spectrum utilization. In addition, a communication can share CDMA and Time Division Multiple Access (TDMA) aspects.

Multi-mode communication devices are designed to transmit and receive digital communications using operating systems chosen from a plurality of multiple access techniques including TDMA, CDMA, GSM, and DCS, and will combine some of these techniques and incorporate them into one device. The receiver portion of a dual mode communication device for example, is similar to those which are not dual mode but are adapted to receive a combination of signals in accordance with any of the systems above. For example, a device operating in a FDD mode can be transmitting in an uplink (UL) on one operating system and receiving on a downlink (DL) on another operating system. In addition, the device is required to occasionally monitor various channel frequencies (FDD, TDD, GSM) of these systems to look for control channels of new base stations.

In order to provide time for a device to monitor for other cells, upper layer commands can direct the device to operate in a compressed mode. In compressed mode, the slot format is changed so as to provide a transmission gap leaving a open time period for the device to perform interfrequency power measurement, acquisition of a control channel of another base station, and handover, for example. When in compressed mode, the information normally transmitted during a frame is compressed in time in order to maintain the amount of data transferred within a frame.

One method to alleviate data throughput problems associated with utilizing a compressed mode is to have a second "monitoring" receiver in the communication device, as outlined in the proposed standard "3rd Generation Partnership Project; Technical Specification Group Radio Access Network; Physical layer—Measurements (FDD) (Release 1999), V3.3.0, Sec. 6.1.1.1 (2000-06). The use of a second receiver eliminates the requirement for the communication device to use a compressed mode in the downlink. However, it may be a requirement for the device to use a compressed uplink mode. For example, a device can be transmitting on the uplink while monitoring the downlink using the second monitoring receiver. Unfortunately, in those cases where the monitoring frequency is close to the uplink transmission frequency (i.e., frequencies in the TDD or GSM/DCS 1800/1900 MHz bands), the communication device can actually interfere with itself. In other words, the transmit power of the device is picked up by, and interferes with, the receiver of the device. Therefore, it has been a requirement to use a compressed mode in the uplink to allow non-transmission time for the device to accurately monitor for base station control channels on nearby frequencies without transmitter interference. This is true even if there is little actual self-interference in the device.

In practice, typical receiver circuitry in a communication device comprises two general portions: a front end portion and a back end portion. The front end portion functions to perform initial filtering, amplification of the desired bandwidth, and conversion to an intermediate frequency for further processing by the backend portion of the receiver. The backend portion converts the signal to the baseband in preparation for digital signal processing. RF signals enter the front end portion via the antenna and are transferred from the front end to the back end.

Controlling the incoming signal power of a radio frequency receiver is essential to maintain signal levels within the operating range of the baseband circuitry and provide proper operation of the receiver. Out-of-band signal power degrades receiver performance as a result of the decreasing signal to noise ratio and receiver selectivity. This may occur when interfering adjacent signals are very strong compared to the desired on-channel signal, such as when a device is transmitting on the uplink while monitoring on a downlink at a nearby frequency. This results in the desired on-channel signal becoming desensitized due to out-of-band noise. Therefore, it is necessary to limit the received signal power prior to the baseband circuitry and maintain signal levels within the back end circuit's operating range. Filter portions of the baseband circuitry reduce the adjacent interference noise signals by allowing only the desired on-channel frequency to pass through. However, the incoming aggregate power level prior to the baseband circuitry comprises the desired monitored signal as well as the interfering uplink energy. The prior art solution is to use uplink compressed or slotted mode whenever monitoring frequencies that are close to the uplink transmission frequency. However, this results in reduced data throughput as outlined above.

Therefore, there is a need to reduce the use of uplink compressed mode during receiver monitoring to increase data throughput. It would also be of benefit to determine those cases where transmitting and receiver at the same time do not result in significant self-interference in the communication device. It would also be advantageous to provide these improvement without any additional hardware or cost in the communication device.

DETAILED DESCRIPTION OF THE PREFERRED EMBODIMENTS

The present invention provides a unique method to reduce uplink compressed mode monitoring near a desired communication signal frequency in a multi-mode receiver circuit for a wireless communications device in a communication system. In a preferred embodiment of the present invention, a method is described to determine those instances where transmitting and receiving at the same time would not result in significant self-interference in the communication device, such that uplink compressed mode is not required, thereby improving data throughput. This improvement is accomplished without any additional hardware or cost in the communication device. Instead of adding circuitry, which in turn adds cost and increases the device size, the present invention advantageously utilizes the existing circuitry in combination with software solutions for the processing of the RF signals from multiple bandwidths necessary in a dual mode communication device.

Figure 1:
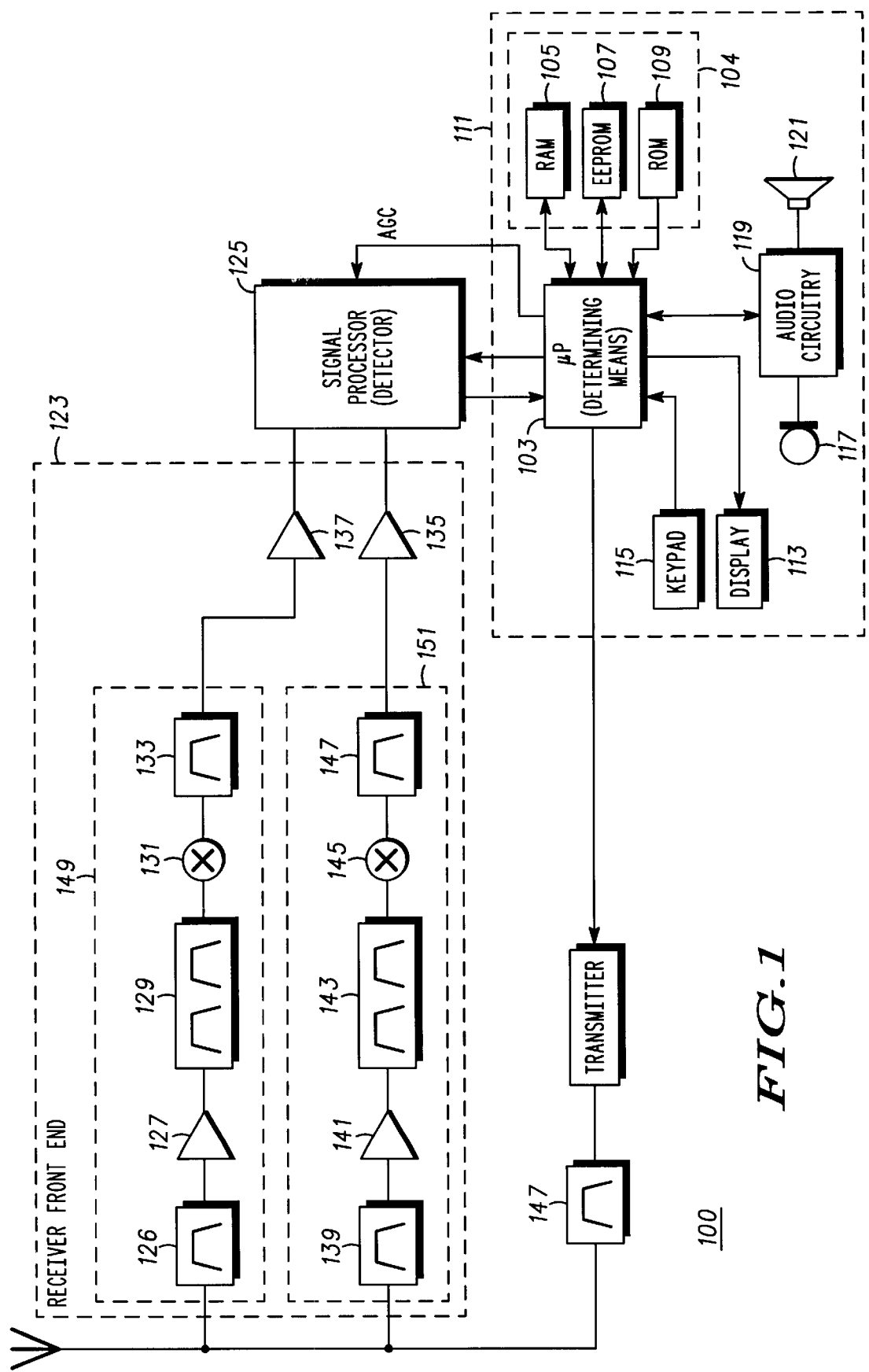
FIG. 1 shows a block diagram of a dual mode radio frequency receiver, in accordance with the present invention.

Turning to FIG. 1, a block diagram of a wireless communication device in accordance with the present invention is shown. Preferably, this device is a cellular radiotelephone incorporating the present invention. In the preferred embodiment a microprocessor 103, such as a 68HC11 microprocessor also available from Motorola, Inc., generates the necessary communication protocol for operating in a compatible cellular system. Microprocessor 103 uses memory 104 comprising RAM 105, EEPROM 107, and/or ROM 109, preferably consolidated in one package 111, to execute the steps necessary to generate the protocol and to perform other functions for the wireless communication device, such as writing to a display 113, accepting information from a keypad 115, or controlling a signal processor 125 which includes controlling receiver gain in accordance with the present invention. The signal processor 125 includes a demodulator, synthesizer, digital signal processor (DSP), and other circuitry known in the art to perform baseband conversion and appropriate active filtering which is necessary for demodulation of the desired communication signal. The microprocessor 103 also processes audio transformed by audio circuitry 119 from a microphone 117 and to a speaker 121.

FIG. 1 also shows the front end receiver circuitry 123 which is capable of receiving RF signals from two distinct frequency bandwidths which is required for operation of a dual mode communication device. The front end receiver is comprised of two channels: channel one 149 for operating in a first desired mode and channel two 151 for operating in a second desired mode. In accordance with one embodiment of the present invention, channel one 149 is tunable to receive normal communication signals and channel two 151 is tunable to monitor for control channels of nearby base stations. In practice, the two receivers are operable on different frequency bands. It is envisioned that the communication device 100 is operable on the 900, 1800, 1900 MHz GSM/DCS and WCDMA bands. The signal processor 125 includes a synthesizer (not shown) that can contain an 1F pre-amp, an IF mixer, an active baseband filter, and an analog-to-digital converter, as are known in the art, for example. The IF pre-amp uses automatic gain control (AGC) to control the aggregate signal gain input to the baseband mixer and the active baseband filter, since both are susceptible to overload. The AGC maintains the baseband circuitry power level within the designed operating range so the receivers may function properly. The baseband IF mixer converts the IF signal into a second IF frequency which is then subsequently filtered by active baseband filter that allows only the desired communication signal to pass for further processing. Although filtered, noise and interference on the desired communication signal frequency passes on to further processing. After the filter, the signal is converted to a digital signal by the analog-to-digital converter. This converter takes all signals (desired communication signal and interference) and converts them to digital data bits which are then further processed including additional soft filtering and demodulation. Digital signal processing has advanced to the point where the incoming signals from both the first and second receiving channel can be processed simultaneously.

The signal processor 125 comprises a detector for detecting self-interference, in accordance with the present invention. The detector estimates the power of the self-interference passed though the receiver channels and provides this estimate to the microprocessor 103 which comprises determining means to compare the signal with estimated or measured signals to determine whether self-interference is present or whether the signal being received is a true received signal.

In accordance with the present invention, the determining means in the microprocessor determines if uplink compressed mode is actually needed under the current cell conditions. In short, one of the receivers is used as an estimator of the self-interference of the communication device (such as from an WCDMA uplink interfering with a DCS downlink for example), and only if such self-interference is found by the determining means, the microprocessor directs the communication device to request a compressed uplink event from the communication system network to eliminate the self-interference. At any other time, the microprocessor can operate normally thereby increasing capacity.

In practice, self-interference is band dependent. For example, TDD and GSM-DCS bands have limited selectivity to self-generated WCDMA transmit noise in the receive path, and the present invention has best effect in this situation. The requirements are actually conditional when many parameters are taken into account. Primarily, the determining means utilize measured signal strength from: the detector, known uplink frequency, known downlink frequency, and the communication device's transmitter power, in determining whether there is enough self-interference to warrant a request for uplink compressed mode. Other secondary parameters can also be taken into account including filter selectivity, actual transmit noise, and coupling effects.

In application, the present invention is best utilized in the DCS band due to its limited selectivity. However, the present invention has application in any multimode communication system wherein a reception frequency is nearby a simultaneous wideband transmission frequency. In addition, the present invention has application in a Global Positioning System wherein the time to correlate a received GPS system signal is long, which may require the muting of the device transmitter.

Figure 2:
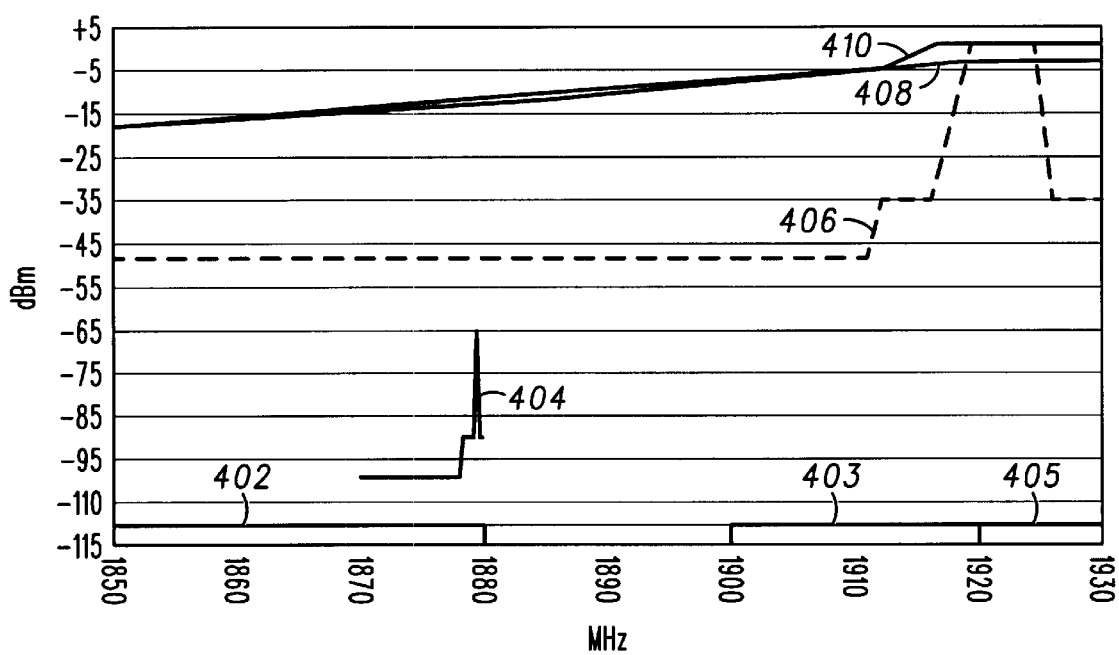
FIG. 2 shows graphical representation of receiver desense, in accordance with the present invention.

FIG. 2 provides an example of the potentially worst-case self-interference noise for a FDD transmitter at full power on the lowest channel closest to the receiver monitoring channel. For example, border 402 represents the DCS downlink band from 1805 MHz to 1880 MHz. Borders 403 and 405 represent the UMTS uplink band from 1900 MHz to 1980 MHz. Border 403 represents the TDD portion of this band, and border 405 represents the potentially more troublesome FDD band, due to the more probable occurrence of simultaneous transmission and reception. In the case shown, a transmission in the FDD UMTS UL occurs in a 3.84 MHz bandwidth. The power spectral density 406 of this transmission shows the transmission in a channel that is closest to the DCS downlink. There is a knee below this channel containing nth order non-linearities, and below this is broadband noise at a power level of about −50 dBm. Curve 404 represents a DCS downlink signal (GSM characteristic) at a closest channel to the wideband transmission. The DCS downlink signal has a bandwidth of 150 kHz. Curve 410 represents the duplex (UMTS) selectivity in this frequency range which actually helps with the DCS DL selectivity.

A receiver under these conditions would have about a −35 dB desense (i.e. the sensitivity at the 1880 MHz channel can be down about 35 dB before the transmitter noise causes interference). In this case, if the desired received signal strength was greater than 35 dB above the receiver sensitivity or the transmitter was transmitting below full power, then proper reception can take place and the used of uplink compressed mode is no longer required. In this way, the communication device can utilize the full data capacity (of the WCDMA channel). In the case shown in FIG. 2 the signal strength is well below the transmitter noise indicating self-interference and the need for uplink compressed mode.

The determining means determine when to use uplink compressed mode by first estimating an expected desense limit of the receiver. For example, desense can be estimated by:

$$\text{Desense(dB)} = D_S + P_{Tx} + R_x + (F_{Rx} * \text{Slope})$$

where $D_S$ is the worst case difference (in dB) between the duplex selectivity and noise at the closest channel during maximum transmit power (e.g. 35 dB at 1880 MHz), $P_{Tx}$ is the difference of the communication device transmit power (in dB) from the maximum allowable transmit power (+24 dBm in the WCDMA system), $R_x$ is the monitored received signal strength above the carrier-to-interference ratio (9 dB in the GSM system), $F_{Rx}$ is the monitoring receive frequency distance (in MHz) from the closest downlink channel (1880 MHz for the DCS band), and Slope is the slope of selectivity (12 dB/75 MHz in the DCS downlink band). For example, if the receiver is tuned to the closet channel (1880 MHz) then $D_S$ is 35 dB (and $F_{Rx}$ is also zero), if the transmitter is transmitting at its highest permissible power (+24 dBm) then $P_{Tx}$ is zero, then if the received signal strength is 9 dB (0 dB over the threshold) then $R_x$ is zero, and the expected desense of the receiver is 35 dB.

Figure 3:
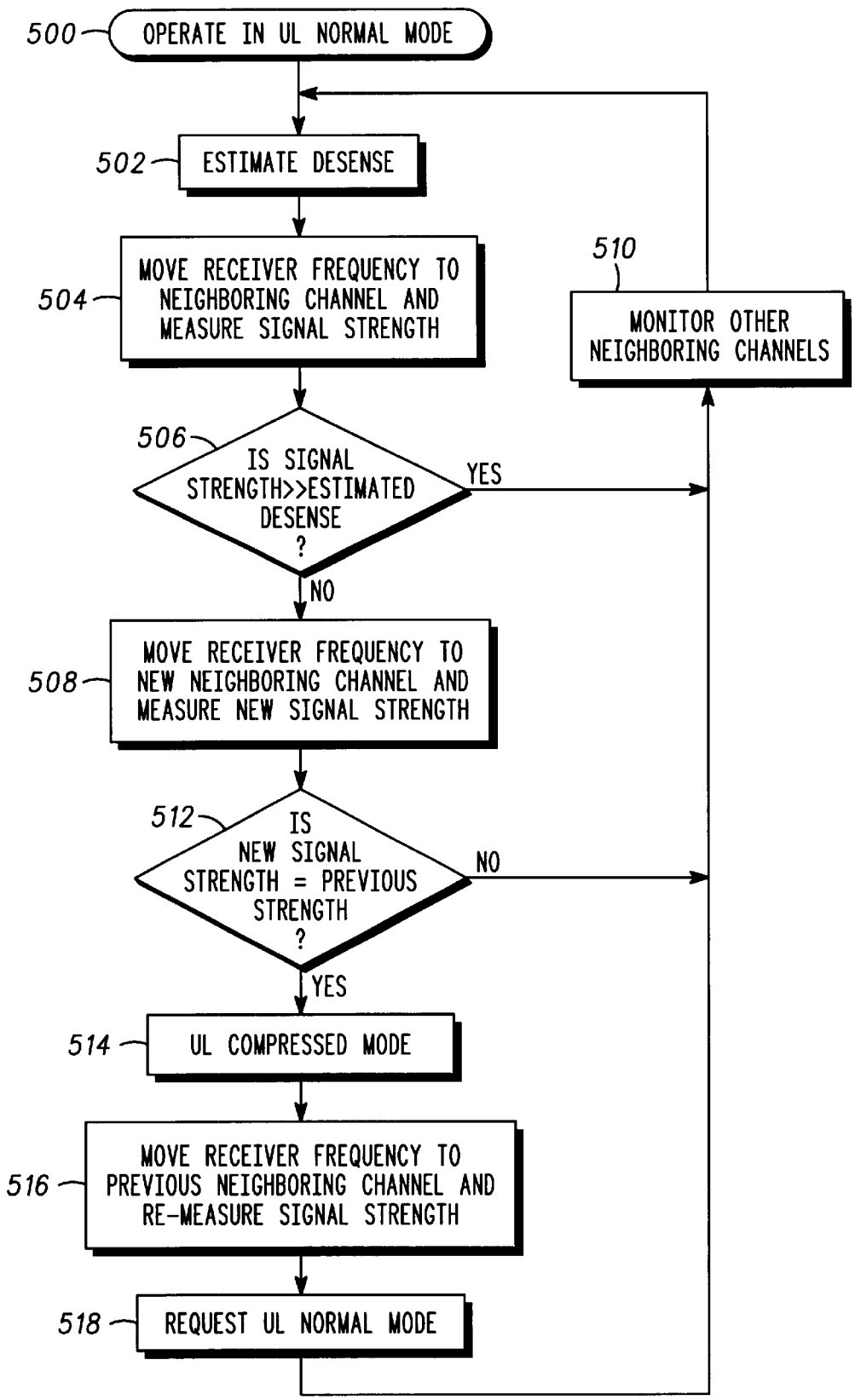
FIG. 3 is a flow chart illustrating the steps of interference detection and compressed mode selection, in accordance with the preferred embodiment of the present invention.

Given a predicted receiver desense, if a neighboring system measurement is needed by the receiver, the determining means can then determine if uplink compressed mode is actually required, using the following process in accordance with the present invention, and as represented in FIG. 3. At start up, a communication device will be operable in a normal, non-compressed uplink mode 500. A next step 502 includes estimating a desense of a monitoring receiver of the communication device, as described above, to determine a threshold. The estimating step includes a signal strength measurement that can also include actual signal strength. Preferably, the threshold is much above the estimated desense level. In practice, the threshold is defined by a GSM carrier-to-interference ratio, wherein the receiver typically has enough sensitivity if the carrier is about 9 dB or more over the noise level. It should be recognized that this estimating step can occur at any stage in the process, but is shown at this point for example only. Moreover, desense can be estimated occasionally to track changing channel conditions or power control, and can occur at different times in the process. A next step 504 includes moving an operating frequency of the monitoring receiver to a neighboring channel and measuring a channel signal strength by the detector.

A next step 506 includes comparing the measured channel signal strength from step 504 to the threshold from step 502, wherein if the measured channel signal strength is much greater than the threshold (e.g. 9 dB), then it is likely that the signal strength is a true reading without significant self-interference, since any self-interference should be of the same magnitude as the estimated desense. If it is decided that the measured signal strength is a true reading, then the communication device can continue operation in normal uplink mode and continue in monitoring 510 other neighboring channels. However, if the measured signal strength is less than the threshold or close to the estimated desense, then it still needs to be determined if the measured signal strength is a true reading or has interference. In this case, a next step 508 includes moving the monitoring receiver operating frequency away from the channel just measured to another channel and measuring a channel signal strength of the new channel.

A next step 512 is determining whether the signal strength of the new channel is similar to that of the previous measured signal strength. If they are different, then the originally measured signal strength is most likely a true reading, and the communication device can continue operation in normal uplink mode and continue in monitoring 510 other neighboring channels. However, if the two measured signal strengths are about the same, it is likely that both signals are measuring interference. Even if it is only coincidental that the signal strengths are actually the same, the method of the present invention will be able to reduce the use of uplink compressed mode. In the case where the signal are about the same, the communication device enters 514 uplink compressed mode operation. This can be accomplished by requesting uplink compressed mode from the communication system network or by autonomously switching into uplink compressed mode. This is followed by a step 516 of moving the operating frequency of the monitoring receiver to the previous channel frequency and re-measuring the signal strength, accepting this as a true measure of signal strength. Afterwards, the communication can request 518 operation in normal uplink mode and continue in monitoring 510 other neighboring channels. The communication device stores a list of the other available neighboring systems and channels as is part of its normal operation. Preferably, the method of the present invention, is best applied when monitoring channels in the DCS band due to the limited selectivity in this band.

In practice, high power transmission in WCDMA mode makes it difficult to monitor DCS 1800 MHz cells due to the high noise generated in the DCS receive (Rx) band by the WCDMA power amplifier. In addition, the WCDMA transmit (Tx) band and the DCS 1800 MHz Rx band are very close to each other (40 MHz), making effective filtering difficult to design, i.e. filtering to isolating the WCDMA Tx band from the DCS Rx band would be a large and costly filter, with high insertion losses, and in consequence degrading the battery lifetime due to power consumption.

The present invention provides a solution to avoid such a filter by using compressed mode in the WCDMA uplink for DCS monitoring. In particular, compressed mode is used when transmitting in WCDMA at high power levels and normal uplink mode is used when transmitting at lower levels. The noise in DCS Rx band generated by the WCDMA power amplifier decreases sufficiently when the transmit output power decreases so as to meet the DCS sensitivity specification. The output power threshold under which the non-compressed mode is achievable is also dependent on the transmitter noise performances. In addition, achieving low noise in Rx band allows the communication device to bypass the WCDMA power amplifier for low levels. This also improves efficiency. In operation, at most times, a typical mobile communication device will be transmitting at low power levels (below 0 dBm). Hence the non-compressed mode for DCS monitoring will be effective most of the time. Only occasionally would the mobile be required to compress WCDMA transmission to monitor DCS cells.

The present invention finds particular application in maintaining optimum data capacity, and only operating in compressed mode where self-interference exists. The method provides a process for the communication device to control whether operation in compressed mode would be beneficial. This is accomplished with existing hardware eliminating the need for additional circuitry hence saving space on the printed circuit board and within the integrated circuits. The ever-increasing capabilities of digital signal processor technology allows for the simultaneous measurements and operation of different modes of the communication signal to provide seamless control.

Although the invention has been described and illustrated in the above description and drawings, it is understood that this description is by way of example only and that numerous changes and modifications can me made by those skilled in the art without departing from the broad scope of the invention. Although the present invention finds particular use in portable cellular radiotelephones, the invention could be applied to any multi-mode wireless communication device, including pagers, electronic organizers, and computers. Applicants' invention should be limited only by the following claims.

What is claimed is:

1. A method to reduce uplink compressed mode monitoring in a communication device, comprising the steps of:
    moving an operating frequency of a monitoring receiver of the communication device to a neighboring channel and measuring a channel signal strength;
    estimating a desense of the monitoring receiver to determine a threshold;
    comparing the signal strength to the threshold, wherein if the signal strength is less than the threshold further comprising the steps of;
        moving the operating frequency of the monitoring receiver to a new neighboring channel and measuring a new channel signal strength;
        comparing the new signal strength to the previous signal strength, wherein if the signal strengths are about the same further comprising the steps of;
        requesting uplink compressed mode; and
        moving the operating frequency of the monitoring receiver to the previous neighboring channel and re-measuring the channel signal strength.

2. The method of claim 1 further comprising the step of repeating all the steps for other neighboring channels.

3. The method of claim 1, wherein the operating frequency of the moving steps is limited to the DCS band.

4. The method of claim 1, wherein the threshold of the estimating step is about 9 dB above the estimated desense level.

5. The method of claim 1, wherein the level of desense of the estimating step is $$\text{Desense(dB)} = D_S + P_{Tx} + R_x + (F_{Rx} * \text{Slope})$$

where $D_S$ is the worst case difference between the duplex selectivity and noise at the closest channel during maximum transmit power, $P_{Tx}$ is the difference of the communication device transmit power from the maximum allowable transmit power, $R_x$ is the monitored received signal strength over the carrier-to-interference threshold, $F_{Rx}$ is the monitoring receive frequency distance from the closest downlink channel, and Slope is the slope of selectivity.

6. The method of claim 1, wherein the communication device operates in a W-CDMA system.

7. The method of claim 1, wherein the step of comparing the new signal strength includes the new signal strength being within 2 dB of the previously measured signal strength.

8. A multi-mode communication device with a radio frequency transmitter and a radio frequency receiver for monitoring neighboring control channels operable on a communication system, the communication device comprising:
    a front end portion for receiving a communication signal from a neighboring channel;
    a back end portion coupled to the front end portion for converting the signal in preparation for digital signal processing;
    a detector coupled to the back end portion, the detector measuring a signal strength; and
    determining means for determining if a signal from the transmitter is interfering with the communication signal, wherein if an interference is determined the determining means directs the communication device to request from the communication system operation in uplink compressed mode.

9. The communication device of claim 8 wherein the determining means utilizes the measured signal strength from the detector, a known uplink frequency, a known downlink frequency, and a power of the transmitter of the communication device in determining whether there is enough interference to warrant a request for uplink compressed mode.

10. The communication device of claim 8 wherein the determining means estimate an expected desense level of the receiver to determine a threshold, wherein if the signal strength is less than the threshold the determining means directs the communication device to monitor a signal strength of a new neighboring channel, whereupon if the signal strength of the new neighboring channel is about the same as the previous signal strength then an interference condition is indicated and uplink compressed mode is requested.

11. The communication device of claim 10 wherein the expected desense is estimated from:

$$\text{Desense(dB)} = D_S + P_{Tx} + R_x + (F_{Rx} * \text{Slope})$$

where $D_S$ is the worst case difference between the duplex selectivity and noise at the closest channel during maximum transmit power, $P_{Tx}$ is the difference of the communication device transmit power from the maximum allowable transmit power, $R_x$ is the monitored received signal strength over the carrier-to-interference threshold, $F_{Rx}$ is the monitoring receive frequency distance from the closest downlink channel, and Slope is the slope of selectivity.

12. The communication device of claim 10 wherein the threshold is about 9 dB above the estimated desense level.

13. The communication device of claim 10 wherein uplink compressed mode is requested if the new signal strength is within 2 dB of the previously measured signal strength.

14. The communication device of claim 8 wherein the receiver operates in the DCS band.

15. The communication device of claim 8 wherein the communication device operates in a W-CDMA system.

16. A multi-mode communication device with a radio frequency transmitter and a radio frequency receiver for monitoring neighboring control channels operable on a communication system, the communication device comprising:
- a front end portion for receiving a communication signal from a neighboring channel;
- a back end portion coupled to the front end portion for converting the signal in preparation for digital signal processing;
- a detector coupled to the back end portion, the detector measuring a signal strength; and
- determining means for determining if a signal from the transmitter is interfering with the communication signal, wherein the determining means estimate an expected desense level of the receiver to determine a threshold, wherein if the signal strength is less than the threshold the determining means directs the communication device to monitor a signal strength of a new neighboring channel, whereupon if the signal strength of the new neighboring channel is about the same as the previous signal strength then an interference condition is indicated and uplink compressed mode is requested.

17. The communication device of claim 16 wherein the expected desense is estimated from:

$$\text{Desense(dB)} = D_S + P_{Tx} + R_x + (F_{Rx} * \text{Slope})$$

where $D_S$ is the worst case difference between the duplex selectivity and noise at the closest channel during maximum transmit power, $P_{Tx}$ is the difference of the communication device transmit power from the maximum allowable transmit power, $R_x$ is the monitored received signal strength over the carrier-to-interference threshold, $F_{Rx}$ is the monitoring receive frequency distance from the closest downlink channel, and Slope is the slope of selectivity.

18. The communication device of claim 16 wherein the threshold is about 9 dB above the estimated desense level.

19. The communication device of claim 16 wherein uplink compressed mode is requested if the new signal strength is within 2 dB of the previously measured signal strength.

20. The communication device of claim 16 wherein the communication device includes a transmitter that operates in a W-CDMA system, the communication device includes two receivers wherein one receiver operates in the DCS band.

* * * * *